(12) United States Patent
Pak (10) Patent No.: US 8,236,141 B2
(45) Date of Patent: Aug. 7, 2012

(54) INDUSTRIAL ROLL WITH SENSORS HAVING CONFORMABLE CONDUCTIVE SHEETS

(75) Inventor: Kisang Pak, Winchester, VA (US)

(73) Assignee: Stowe Woodward, L.L.C., Middletown, VA (US)

( * ) Notice: Subject to any disclaimer, the term of this patent is extended or adjusted under 35 U.S.C. 154(b) by 465 days.

(21) Appl. No.: 12/489,711

(22) Filed: Jun. 23, 2009

(65) Prior Publication Data

US 2010/0319868 A1 Dec. 23, 2010

(51) Int. Cl.
*D21F 1/48* (2006.01)
(52) U.S. Cl. ......... 162/363; 73/780; 73/862.52; 73/768; 73/790; 73/159; 703/138; 703/151
(58) Field of Classification Search .................. 162/363; 703/138, 151; 73/780, 862.52, 768, 790, 73/159
See application file for complete search history.

(56) References Cited

U.S. PATENT DOCUMENTS

| | | |
|---|---|---|
| 2,815,907 A | 12/1957 | McCormick |
| 3,308,476 A | 3/1967 | Kleesattel |
| 3,562,883 A | 2/1971 | Kobayashi |
| 3,665,650 A | 5/1972 | Przygocki |
| 3,962,911 A | 6/1976 | Grenlund |
| 4,016,756 A | 4/1977 | Kunkle |
| 4,233,011 A | 11/1980 | Bolender et al. |
| 4,366,025 A | 12/1982 | Gordon, Jr. et al. |
| 4,445,349 A | 5/1984 | Eibe |
| 4,498,383 A | 2/1985 | Pav et al. |
| 4,509,237 A | 4/1985 | Volz et al. |

(Continued)

FOREIGN PATENT DOCUMENTS

DE 863133 1/1953

(Continued)

OTHER PUBLICATIONS

International Search Report and Written Opinion for PCT/US2010/038581 mailed Dec. 23, 2010.

(Continued)

*Primary Examiner* — Matthew Daniels
*Assistant Examiner* — Jacob Thomas Minskey
(74) *Attorney, Agent, or Firm* — Myers Bigel Sibley & Sajovec (57) ABSTRACT

An industrial roll includes: a substantially cylindrical core having an outer surface and an internal lumen; a polymeric cover circumferentially overlying the core outer surface; and a sensing system. The sensing system includes: a plurality of sensors at least partially embedded in the cover, the sensors configured to sense an operating parameter of the roll and provide signals related to the operating parameter; and a processor operatively associated with the sensors that processes signals provided by the sensors. Each of the plurality of sensors includes: a first electrode overlying the top surface of a substrate and a second electrode underlying the bottom surface of the substrate, wherein the first electrode overlies the top surface of the substrate and the second electrode underlies only a portion of the bottom surface of the substrate, thereby forming a gap adjacent the bottom surface and a side surface of the substrate; a first sheet of conductive material attached to the first electrode and the side surface of the substrate and extended in a first direction away from the bottom surface of the substrate; and a second sheet of conductive material attached to the second electrode and extended in a second direction away from the bottom surface of the substrate, the second surface being opposite the first direction.

27 Claims, 5 Drawing Sheets

U.S. PATENT DOCUMENTS

| | | | |
|---|---|---|---|
| 4,729,153 A | 3/1988 | Pav et al. | |
| 4,871,908 A | 10/1989 | Skuratovsky et al. | |
| 4,898,012 A | 2/1990 | Jones et al. | |
| 4,903,517 A | 2/1990 | Van Haag et al. | |
| 4,910,985 A | 3/1990 | Ballyns | |
| 4,938,045 A | 7/1990 | Rosenstock et al. | |
| 5,048,353 A | 9/1991 | Justus | |
| 5,086,220 A | 2/1992 | Berthold et al. | |
| 5,379,652 A | 1/1995 | Allonen | |
| 5,383,371 A | 1/1995 | Laitinen | |
| 5,466,343 A | 11/1995 | Kankaanpaa | |
| 5,535,240 A | 7/1996 | Carney et al. | |
| 5,562,027 A | 10/1996 | Moore | |
| 5,592,875 A | 1/1997 | Moschel | |
| 5,684,871 A | 11/1997 | Devon et al. | |
| 5,684,912 A | 11/1997 | Slaney et al. | |
| 5,699,729 A | 12/1997 | Moschel | |
| 5,739,626 A | 4/1998 | Kojima et al. | |
| 5,799,533 A * | 9/1998 | Seki et al. | 73/172 |
| 5,848,097 A | 12/1998 | Carney et al. | |
| 5,874,723 A | 2/1999 | Hasegawa et al. | |
| 5,915,648 A | 6/1999 | Madrzak et al. | |
| 5,925,220 A | 7/1999 | Hirsch et al. | |
| 5,947,401 A | 9/1999 | Niccum | |
| 5,953,230 A | 9/1999 | Moore | |
| 6,006,100 A | 12/1999 | Koenck et al. | |
| 6,284,103 B1 | 9/2001 | Eng et al. | |
| 6,328,681 B1 | 12/2001 | Stephens | |
| 6,341,522 B1 | 1/2002 | Goss et al. | |
| 6,354,013 B1 | 3/2002 | Mucke et al. | |
| 6,361,483 B1 | 3/2002 | Kirchner | |
| 6,375,602 B1 | 4/2002 | Jones | |
| 6,441,904 B1 | 8/2002 | Shakespeare | |
| 6,568,285 B1 | 5/2003 | Moore | |
| 6,617,764 B2 | 9/2003 | Sebastian et al. | |
| 6,752,908 B2 | 6/2004 | Gustafson | |
| 6,874,232 B2 | 4/2005 | Madden et al. | |
| 6,892,563 B2 | 5/2005 | Gustafson et al. | |
| 6,910,376 B2 | 6/2005 | Maenpaa | |
| 6,981,935 B2 | 1/2006 | Gustafson | |
| 6,988,398 B2 | 1/2006 | Saloniemi et al. | |
| 7,185,537 B2 | 3/2007 | Muhs | |
| 7,225,688 B2 | 6/2007 | Moore et al. | |
| 7,392,715 B2 | 7/2008 | Moore et al. | |
| 7,572,214 B2 | 8/2009 | Gustafson | |
| 7,581,456 B2 | 9/2009 | Moore et al. | |
| 2004/0053758 A1 | 3/2004 | Gustafson | |
| 2005/0261115 A1* | 11/2005 | Moore et al. | 492/10 |
| 2009/0320612 A1 | 12/2009 | Moore et al. | |

FOREIGN PATENT DOCUMENTS

| | | |
|---|---|---|
| DE | 199 20 133 | 11/2000 |
| EP | 1 493 565 A2 | 1/2005 |
| EP | 1 653 207 A2 | 5/2006 |
| EP | 1 719 836 A1 | 11/2006 |
| FR | 2 769 379 | 4/1999 |
| JP | 2006164244 A | 6/2006 |
| WO | WO 96/34262 A1 | 10/1996 |
| WO | WO 01/53787 A1 | 7/2001 |

OTHER PUBLICATIONS

Anonymous "Les capteurs à fibres optiques opérationnels?" *Mesures Regulation Automatisme*, FR, CFW, Paris, Oct. 20, 1986, pp. 49-51, 53, 55, vol. 51, No. 13 (XP002083807).

Bazergui, A., and M.L. Meyer, "Embedded Strain Gages for the Measurement of Strains in Rolling Contact," *Experimental Mechanics*, Oct. 1968, pp. 433-441.

Keller, S.F., "Measurement of the Pressure-Time Profile in a Rolling Calender Nip," $77^{th}$ *Annual Meeting of the Canadian Section of the Pulp and Paper Assn. 1991*, pp. B89-B96.

Knowles, S.F., et al., "Multiple Microbending Optical-fibre Sensors for Measurement of Fuel Quantity in Aircraft Fuel Tanks," *Sensors and Actuators*, Jun. 15, 1998, pp. 320-323, vol. 68. No. 1-3 (XP004139852).

Koriseva, J., et al., "Soft Calendar Nip: An Interesting Subject for Research and Measurement," *Paper and Timber*, 1991, pp. 419-423, vol. 73, No. 5.

McCollum, T., and G. B. Spector, "Fiber Optic Microbend Sensor for Detection of Dynamic Fluid Pressure at Gear Interfaces," *Rev. Sci. Instrum.*, Mar. 1, 1994, pp. 724-729. vol. 65, No. 3 (XP000435198).

McNamee, J.P., "A Study of Rubber Covered Press Roll Nip Dynamics, Part 1," *The Journal of the Technical Association of the Pulp and Paper Industry*, Dec. 1965. pp. 673-679, vol. 48, No. 12.

Merriman, T.L., "Transducers and Techniques of Contact Pressure Measurement," Paper presented at *The Society for Experimental Mechanics, Spring Conference*, Jun. 1991, pp. 318-320.

Parish, G.J., "Measurements of Pressure Distribution Between Metal and Rubber Covered Rollers," *British Journal of Applied Physics*, Apr. 1959, pp. 158-161, vol. 9.

Spengos, A.C., "Experimental Investigation of Rolling Contact" *Journal of Applied Mechanics*, Dec. 1965, pp. 859-864.

International Search Report for PCT/US01/02013, mailed May 22, 2001.

International Search Report for PCT/US03/18895 mailed Sep. 30, 2003.

International Search Report for PCT/US2005/016456 mailed Sep. 5, 2005.

European Search Report for EP 05 02 7237, dated Aug. 29, 2006.

U.S. Appl. No. 12/488,753, filed Jun. 22, 2009, Kisang Pak, Industrial Roll with Sensors Arranged to Self-identify Angular Location.

International Preliminary Search Report for PCT/US2010/038581 mailed Jan. 12, 2012.

* cited by examiner

INDUSTRIAL ROLL WITH SENSORS HAVING CONFORMABLE CONDUCTIVE SHEETS

FIELD OF THE INVENTION

The present invention relates generally to industrial rolls, and more particularly to rolls for papermaking.

BACKGROUND OF THE INVENTION

In a typical papermaking process, a water slurry, or suspension, of cellulosic fibers (known as the paper "stock") is fed onto the top of the upper run of an endless belt of woven wire and/or synthetic material that travels between two or more rolls. The belt, often referred to as a "forming fabric," provides a papermaking surface on the upper surface of its upper run which operates as a filter to separate the cellulosic fibers of the paper stock from the aqueous medium, thereby forming a wet paper web. The aqueous medium drains through mesh openings of the forming fabric, known as drainage holes, by gravity or vacuum located on the lower surface of the upper run (i.e., the "machine side") of the fabric.

After leaving the forming section, the paper web is transferred to a press section of the paper machine, where it is passed through the nips of one or more presses (often roller presses) covered with another fabric, typically referred to as a "press felt." Pressure from the presses removes additional moisture from the web; the moisture removal is often enhanced by the presence of a "batt" layer of the press felt. The paper is then transferred to a dryer section for further moisture removal. After drying, the paper is ready for secondary processing and packaging.

Cylindrical rolls are typically utilized in different sections of a papermaking machine, such as the press section. Such rolls reside and operate in demanding environments in which they can be exposed to high dynamic loads and temperatures and aggressive or corrosive chemical agents. As an example, in a typical paper mill, rolls are used not only for transporting the fibrous web sheet between processing stations, but also, in the case of press section and calender rolls, for processing the web sheet itself into paper.

Typically rolls used in papermaking are constructed with the location within the papermaking machine in mind, as rolls residing in different positions within the papermaking machines are required to perform different functions. Because papermaking rolls can have many different performance demands, and because replacing an entire metallic roll can be quite expensive, many papermaking rolls include a polymeric cover that surrounds the circumferential surface of a typically metallic core. By varying the material employed in the cover, the cover designer can provide the roll with different performance characteristics as the papermaking application demands. Also, repairing, regrinding or replacing a cover over a metallic roll can be considerably less expensive than the replacement of an entire metallic roll. Exemplary polymeric materials for covers include natural rubber, synthetic rubbers such as neoprene, styrene-butadiene (SBR), nitrile rubber, chlorosulfonated polyethylene ("CSPE"—also known under the trade name HYPALON® from DuPont), EDPM (the name given to an ethylene-propylene terpolymer formed of ethylene-propylene diene monomer), polyurethane, thermoset composites, and thermoplastic composites.

In many instances, the roll cover will include at least two distinct layers: a base layer that overlies the core and provides a bond thereto; and a topstock layer that overlies and bonds to the base layer and serves the outer surface of the roll (some rolls will also include an intermediate "tie-in" layer sandwiched by the base and top stock layers). The layers for these materials are typically selected to provide the cover with a prescribed set of physical properties for operation. These can include the requisite strength, elastic modulus, and resistance to elevated temperature, water and harsh chemicals to withstand the papermaking environment. In addition, covers are typically designed to have a predetermined surface hardness that is appropriate for the process they are to perform, and they typically require that the paper sheet "release" from the cover without damage to the paper sheet. Also, in order to be economical, the cover should be abrasion- and wear-resistant.

As the paper web is conveyed through a papermaking machine, it can be very important to understand the pressure profile experienced by the paper web. Variations in pressure can impact the amount of water drained from the web, which can affect the ultimate sheet moisture content, thickness, and other properties. The magnitude of pressure applied with a roll can, therefore, impact the quality of paper produced with the paper machine.

It is known to include pressure and/or temperature sensors in the cover of an industrial roll. For example, U.S. Pat. No. 5,699,729 to Moschel et al. describes a roll with a helically-disposed leads that includes a plurality of pressure sensors embedded in the polymeric cover of the roll. The sensors are helically disposed in order to provide pressure readings at different axial locations along the length of the roll. Typically the sensors are connected to two leads which transmit sensor signals to a processor that processes the signals and provides pressure and position information.

The sensors typically include a substrate, such as a piezoelectric material, with electrodes attached to its top and bottom surfaces. Sheets of conductive material are attached to the electrodes and extended away from the substrate in opposite directions. The extended portions of conductive material (sometimes called "wings") serve as connection points for the leads. The two wings lie in substantially the same plane such that the sensor can lay flat. One wing is formed by extending the sheet attached to the bottom electrode directly away from the substrate. However, to form the other wing, the sheet attached to the top electrode is cantilevered from the top surface of the electrode and is deflected "down" to the level of the bottom wing. As a result, this sheet spans an unsupported distance and is susceptible to catastrophic failure at or near this unsupported section. This is especially the case during operation when the roll is exposed to high dynamic loads and temperatures and aggressive or corrosive chemical agents.

SUMMARY OF THE INVENTION

The present invention can address some of the issues raised by prior industrial rolls. As a first aspect, embodiments of the present invention are directed to an industrial roll, including: a substantially cylindrical core having an outer surface and an internal lumen; a polymeric cover circumferentially overlying the core outer surface; and a sensing system. The sensing system includes: a plurality of sensors at least partially embedded in the cover, the sensors configured to sense an operating parameter of the roll and provide signals related to the operating parameter; and a processor operatively associated with the sensors that processes signals provided by the sensors. Each of the plurality of sensors includes: a first electrode overlying the top surface of a substrate and a second electrode underlying the bottom surface of the substrate, wherein the first electrode overlies the top surface of the substrate and the second electrode underlies only a portion of the bottom surface of the substrate, thereby forming a gap adjacent the bottom surface and a side surface of the substrate; a first sheet of conductive material attached to the first electrode and the side surface of the substrate and extended in a first direction away from the bottom surface of the substrate; and a second sheet of conductive material attached to the second electrode and extended in a second direction away from the bottom surface of the substrate, the second surface being opposite the first direction.

As a second aspect, embodiments of the present invention are directed to an industrial roll, including: a substantially cylindrical core having an outer surface and an internal lumen; a polymeric cover circumferentially overlying the core outer surface; and a sensing system. The sensing system includes: a plurality of sensors at least partially embedded in the cover, the sensors configured to sense an operating parameter of the roll and provide signals related to the operating parameter; and a processor operatively associated with the sensors that processes signals provided by the sensors. Each of the plurality of sensors includes: a first electrode overlying the top surface of a substrate and a second electrode underlying the bottom surface of the substrate, wherein the first electrode overlies the top surface of the substrate and the second electrode underlies only a portion of the bottom surface of the substrate, thereby forming a gap adjacent the bottom surface and a side surface of the substrate, and wherein the top surface and the side surface of the substrate form an obtuse angle; a first sheet of conductive material attached to the first electrode and the side surface of the substrate and extended in a first direction away from the bottom surface of the substrate; and a second sheet of conductive material attached to the second electrode and extended in a second direction away from the bottom surface of the substrate, the second surface being opposite the first direction.

As a third aspect, embodiments of the present invention are directed to an industrial roll, including: a substantially cylindrical core having an outer surface and an internal lumen; a polymeric cover circumferentially overlying the core outer surface; and a sensing system. The sensing system includes: a plurality of piezoelectric sensors at least partially embedded in the cover, the sensors configured to sense pressure experienced by the roll and provide signals related to the pressure; and a processor operatively associated with the sensors that processes signals provided by the sensors. Each of the plurality of piezoelectric sensors includes: a first electrode overlying the top surface of a substrate and a second electrode underlying the bottom surface of the substrate, wherein the first electrode overlies the top surface of the substrate and the second electrode underlies only a portion of the bottom surface of the substrate, thereby forming a gap adjacent the bottom surface and a side surface of the substrate; a first sheet of conductive material attached to the first electrode and the side surface of the substrate and extended in a first direction away from the bottom surface of the substrate; and a second sheet of conductive material attached to the second electrode and extended in a second direction away from the bottom surface of the substrate, the second surface being opposite the first direction.

DETAILED DESCRIPTION OF EMBODIMENTS OF THE INVENTION

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Well-known functions or constructions may not be described in detail for brevity and/or clarity.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. As used herein, the term "and/or" includes any and all combinations of one or more of the associated listed items. Where used, the terms "attached," "connected," "interconnected," "contacting," "coupled," "mounted," "overlying" and the like can mean either direct or indirect attachment or contact between elements, unless stated otherwise.

Figure 1:
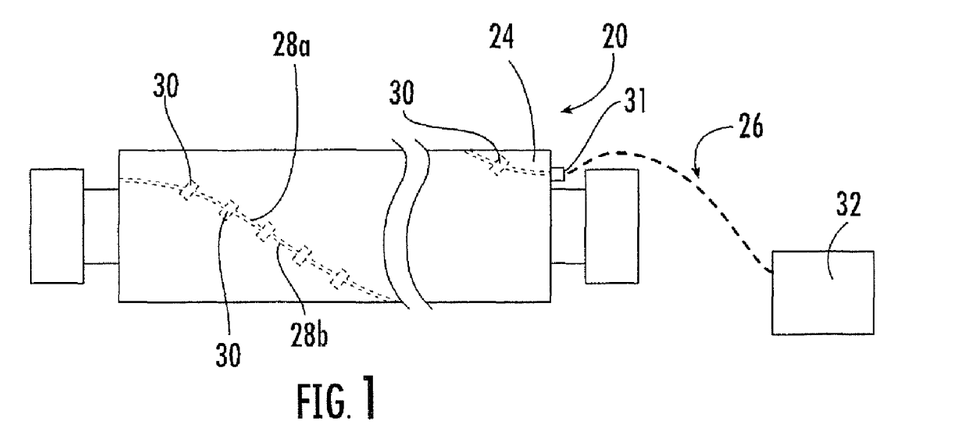
FIG. 1 is a gage view of a roll and detecting system of the present invention.

Referring now to the figures, a roll, designated broadly at 20, is illustrated in FIG. 1. The roll 20 includes a cylindrical core 22 (see FIG. 2) and a cover 24 (typically formed of one or more polymeric materials) that encircles the core 22. A sensing system 26 for sensing an operating parameter, such as pressure or temperature, includes a pair of electrical leads 28a, 28b and a plurality of sensors 30, each of which is at least partially embedded in the cover 24. As used herein, a sensor being "embedded" in the cover means that the sensor is entirely contained within the cover, and a sensor being "embedded" in a particular layer or set of layers of the cover means that the sensor is entirely contained within that layer or set of layers. The sensing system 26 also includes a processor 32 that processes signals produced by the sensors 30.

The core 22 is typically formed of a metallic material, such as steel or cast iron. The core 22 can be solid or hollow, and if hollow may include devices that can vary pressure or roll profile.

The cover 24 can take any form and can be formed of any polymeric and/or elastomeric material recognized by those skilled in this art to be suitable for use with a roll. Exemplary materials include natural rubber, synthetic rubbers such as neoprene, styrene-butadiene (SBR), nitrile rubber, chlorosulfonated polyethylene ("CSPE"—also known under the trade name HYPALON), EDPM (the name given to an ethylene-propylene terpolymer formed of ethylene-propylene diene monomer), epoxy, and polyurethane. The cover 24 may also include reinforcing and filler materials, additives, and the like. Exemplary additional materials are discussed in U.S. Pat. No. 6,328,681 to Stephens, U.S. Pat. No. 6,375,602 to Jones, and U.S. Pat. No. 6,981,935 to Gustafson, the disclosures of each of which are hereby incorporated herein in their entireties.

Figure 2:
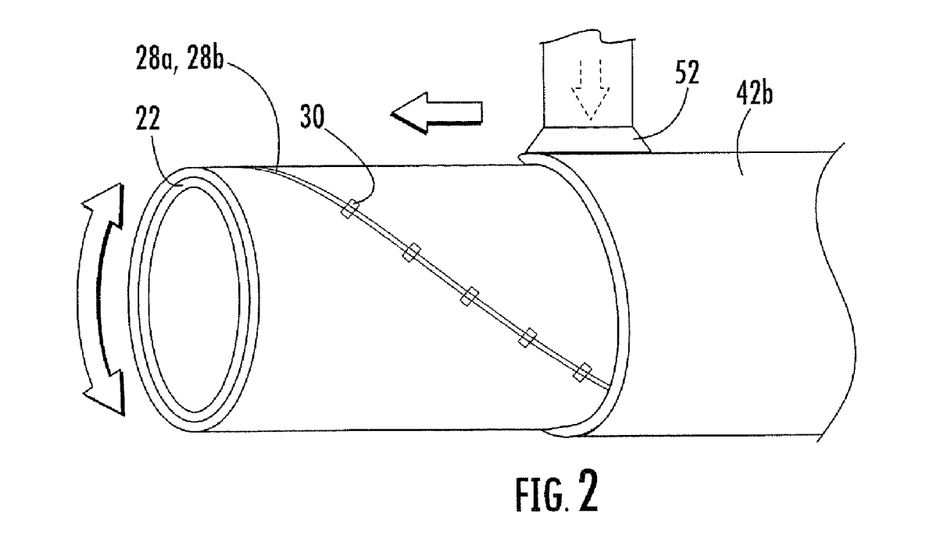
FIG. 2 is a gage perspective view of the outer base layer being applied over the inner base layer, cables and sensors of the roll of FIG. 1.
Figure 3:
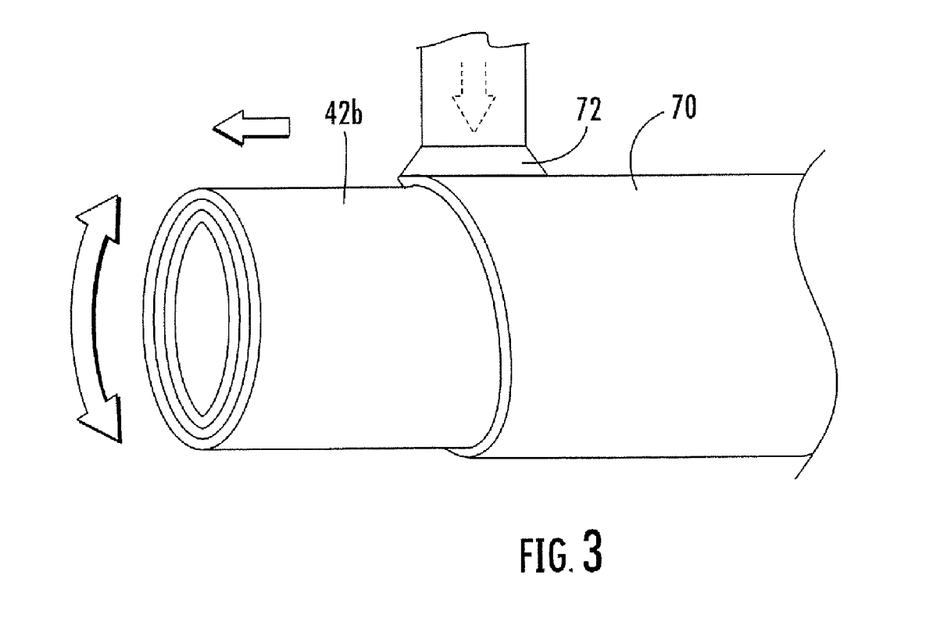
FIG. 3 is a gage perspective view of the topstock layer being applied over the outer base layer of FIG. 2.

In many instances, the cover 24 will comprise multiple layers. FIGS. 2 and 3 illustrate the application of an inner base layer 42a, an outer base layer 42b and a topstock layer 70; additional layers, such as a "tie-in" layer between the outer base and topstock layers 42b, 70 and an adhesive layer between the core 22 and the inner base layer 42a, may also be included.

Figure 4A:
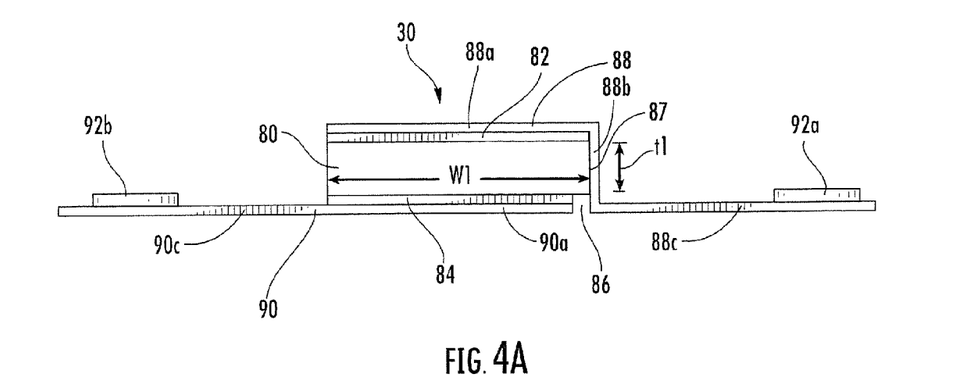
FIG. 4A is a side view of a sensor according to some embodiments of the present invention.
Figure 4B:
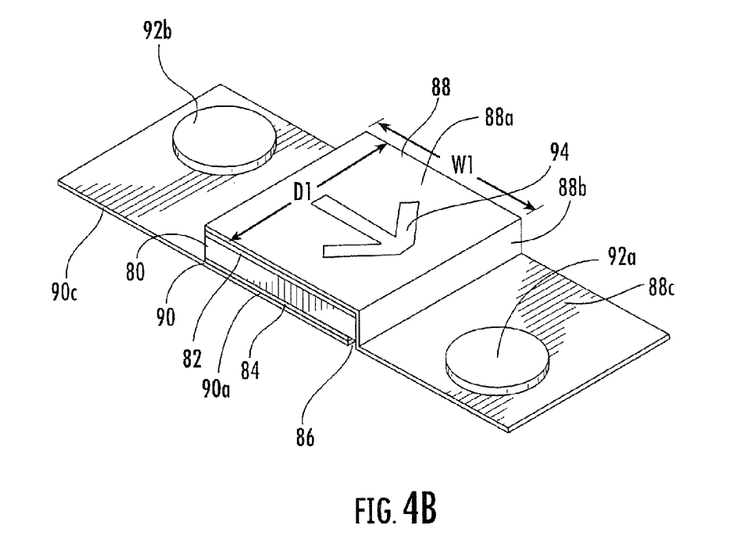
FIG. 4B is a top perspective view of the sensor of FIG. 4A.

Referring again to FIG. 1 and to FIGS. 4A-4B, the sensors 30 of the sensing system 26 are suitable for detecting an operating parameter of the roll 20, such as pressure. As discussed in more detail below, the sensors 30 typically include a substrate 80, electrodes 82, 84 attached to the top and bottom surfaces of the substrate, and a sheet of conductive material 88, 90 attached to each electrode. The sheets of conductive material 88, 90 extend away from the substrate in opposite directions. The substrate 80 may comprise a piezoelectric material and the sensor may generally be termed a piezoelectric sensor. Exemplary piezoelectric sensors are discussed in pending U.S. Patent Publication No. 2005/0261115 to Moore, the disclosure of which is hereby incorporated herein in its entirety. Piezoelectric sensors can include any device that exhibits piezoelectricity when undergoing changes in pressure, temperature or other physical parameters. "Piezoelectricity" is defined as the generation of electricity or of electrical polarity in dielectric crystals subjected to mechanical or other stress, the magnitude of such electricity or electrical polarity being sufficient to distinguish it from electrical noise. Exemplary piezoelectric sensors include piezoelectric sensors formed of piezoelectric ceramic, such as PZT-type lead-zirgonate-titanate, quartz, synthetic quartz, tourmaline, gallium ortho-phosphate, CGG ($Ca_3Ga_2Ge_4O_{14}$), lithium niobate, lithium tantalite, Rochelle salt, and lithium sulfate-monohydrate. In particular, the sensor material can have a Curie temperature of above 350° F., and in some instances 600° F., which can enable accurate sensing at the temperatures often experienced by rolls in papermaking environments.

Still referring to FIG. 1, the leads 28a, 28b of the sensing system 26 can be any signal-carrying members recognized by those skilled in this art as being suitable for the passage of electrical signals in a roll. As discussed above, the sheets of conductive material 88, 90 extend away from the substrate in opposite directions. The leads 28a, 28b contact the extended portions, sometimes called "wings."

The sensing system 26 includes a multiplexer 31 or other data collection device mounted to the end of the roll 20. The multiplexer 31 receives and collects signals from the sensors 30 and transmits them to a processer 32. The processor 32 is typically a personal computer or similar data exchange device, such as the distributive control system of a paper mill, that is operatively associated with the sensors 30 and that can process signals from the sensors 30 into useful, easily understood information. In some embodiments, a wireless communication mode, such as RF signaling, is used to transmit the data collected from the sensors 30 from the multiplexer 31 to the processor 32. Other alternative configurations include slip ring connectors that enable the signals to be transmitted from the sensors 30 to the processor 32. Suitable exemplary processing units are discussed in U.S. Pat. No. 5,562,027 and U.S. Pat. No. 7,392,715 to Moore and U.S. Pat. No. 6,752,908 to Gustafson et al., the disclosures of each of which are hereby incorporated herein in their entireties.

The roll 20 can be manufactured in the manner described, for example, in pending U.S. Patent Publication No. 2005/0261115, the disclosure of which is hereby incorporated herein in its entirety. In this method, initially the core 22 is covered with a portion of the cover 24 (such as the inner base layer 42a). The inner base layer 42a can be applied with an extrusion nozzle (not shown), although the inner base layer 42a may be applied by other techniques known to those skilled in this art. Typically the inner base layer 42a is formed of rubber or epoxy-based composite materials, and has a thickness of between about 0.030 and 0.350 inches.

After the formation of the inner base layer 42a, the leads 28a, 28b and sensors 30 of the sensor system 26 are installed (FIG. 2). Once the sensors 30 are in desired positions, they can be adhered in place. This may be carried out by any technique known to those skilled in this art; an exemplary technique is adhesive bonding.

Referring again to FIG. 2, once the sensors 30 and leads 28a, 28b have been positioned and affixed to the inner base layer 42a, the remainder of the base layer 42 (i.e., the outer base layer 42b) is applied. FIG. 2 illustrates the application of the outer base layer 42b via an extrusion nozzle 52, although those skilled in this art will appreciate that the application of the outer base layer 42b can be carried out by any technique recognized as being suitable for such application. In a typical roll, the outer base layer 42b is formed of rubber or epoxy-based composite materials and has a thickness of between about 0.030 and 0.350 inches, such that the sensors 30 are embedded in the base layer 42. Also, typically the outer base layer 42b will be formed of the same material as the inner base layer 42a.

As noted above, the present invention is intended to include rolls having covers that include only a base layer and top stock layer as well as rolls having covers with additional intermediate layers. Any intermediate layers would be applied over the outer base layer 42b prior to the application of the topstock layer 70.

Turning now to FIG. 3, the topstock layer 70 is applied over the outer base layer 42b. The topstock layer 70 is typically formed of rubber or polyurethane, and may be applied via any technique known to those skilled in this art to be suitable for the application of a polymeric layer, although FIG. 3 illustrates application via an extrusion nozzle 72. The topstock layer 70 is typically a polymeric material that has a hardness that is lower than that of the base layer 42. The topstock layer 70 is ordinarily between about 0.200 and 4.00 inches in thickness. Application of the top stock layer 70 is followed by curing, techniques for which are well-known to those skilled in this art and need not be described in detail herein.

The completed roll 20 and cover 24 can then be used in, for example, a papermaking machine. In some embodiments, the roll 20 is part of a nip press, wherein another roll or pressing device is positioned adjacent the roll 20 to form a nip through which a forming paper web can pass. In such environments, it can be important to monitor the pressure experienced by the cover 24, particularly in the nip area. The sensing system 26 can provide pressure information for different axial locations along the cover 24, with each of the sensors 30 providing pressure information about a different axial location on the roll 20.

In operation, the roll 20 and cover 24 rotate about the axis of the roll 20 at very high speeds. Each time one of the sensors 30 passes through the nip created by the roll 20 and a mating roll or press, the sensor 30 will transmit a pulse generated by the pressure the mating roll exerts on the area of the cover 20 above the sensor 30. When no sensor 30 is present in the nip, no significant pulses beyond the level of general noise are generated. Thus, as the roll 20 rotates, each sensor 30 travels through the nip and provides pulses representative of the pressure at its corresponding location. Consequently, data in the form of pulses is generated by the sensors 30, transmitted along the leads 28a, 28b, and received in the multiplexer 31. In a typical data retrieval session, 12-20 pulses are received per sensor 30; these individual pulses can be stored and processed into representative pressure signals for each sensor 30. Once the raw sensor data is collected, it is sent from the multiplexer 31 to the processor 32 for processing into an easily understood form, such as a pressure profile of the roll 20 along its length.

FIGS. 4A-4B illustrate in detail the sensor 30 according to some embodiments of the present invention. The sensor 30 includes the substrate 80. The substrate 80 may be a piezoelectric material. The substrate 80 typically has a width W1 between about 2 mm and about 20 mm, a depth D1 between about 2 mm and about 20 mm, and a thickness t1 between about 0.5 mm and about 5 mm.

The first electrode 82 overlies the top surface of the substrate 80 and the second electrode 84 underlies the bottom surface of the substrate 80. The electrodes 82, 84 typically have thicknesses of less than about 0.05 mm (0.002 inches). The first electrode 82 overlies the entire width W1 of the substrate 80. The second electrode 84 underlies only a portion of the width W1 of the substrate 80, thereby forming a gap 86 adjacent the bottom surface and a side surface 87 of the substrate 80. The gap 86 typically has a width of between about 0.5 mm and about 5 mm and spans the entire depth D1 of the substrate 80. In the illustrated embodiment, the top surface and the side surface 87 of the substrate 80 form a right angle.

A top portion 88a of the first sheet of conductive material 88 is attached to the first electrode 82. The first sheet of conductive material 88 is bent and attached to the side surface 87 of the substrate 80, thereby forming a side portion 88b of the first sheet of conductive material 88. The first sheet of conductive material 88 is bent again to extend in a first direction away from the bottom of the substrate 80, thereby forming an extended portion 88c of the first sheet of conductive material 88. The side portion 88b is attached to the side surface 87 of the substrate 80 by any technique known to those skilled in this art; an exemplary technique is adhesive bonding via the use of adhesive transfer tape manufactured by 3M™. Because the first sheet of conductive material 88 is attached to the side surface 87 of the substrate 80, the first sheet 88 does not span an unsupported distance as it is extended away from the substrate 80. The likelihood of catastrophic failure of the first sheet of conductive material 88 is greatly reduced because it is fully supported along its length.

A bottom portion 90a of the second sheet of conductive material 90 is attached to the second electrode 84. The second sheet of conductive material 90 is extended in a second direction away from the bottom of the substrate 80, thereby forming an extended portion 90c of the second sheet of conductive material 90. The second direction associated with the second sheet of conductive material 90 is opposite the first direction associated with the first sheet of conductive material 88. In this regard, the extended portions 88c, 90c serve as "wings" which may contact the leads 28a, 28b, as described in more detail below.

The bottom portion 90a of the second sheet of conductive material 90 is attached to the second electrode 84 such that the gap 86 is preserved. The gap 86 serves to electrically isolate the electrodes 82, 84 as well as the sheets of conductive material 88, 90.

The sheets of conductive material 88, 90 typically have thicknesses between about 0.001 and about 0.1 inches. The extended portions 88c, 90c typically extend a distance between about 2 mm and about 20 mm away from the bottom of the substrate 80. The sheets of conductive material 88, 90 may be copper or any other conductive material.

In some embodiments, the sensor 30 includes lead mounting locations 92a, 92b, which may serve as connection points for the leads 28a, 28b. The first lead mounting location 92a is located on the extended portion 88c of the first sheet of conductive material 88 and the second lead mounting location 92b is located on the extended portion 90c of the second sheet of conductive material 90. As illustrated in FIG. 4B, the lead mounting locations 92a, 92b may be offset such the first lead mounting location 92a is positioned diagonally opposite the second lead mounting location 92b. In some embodiments, the lead mounting locations 92a, 92b are solder dots.

As illustrated in FIG. 4B, the sensor 30 may include an indicator 94 to clearly indicate the polarity of the electrodes 82, 84 and the sheets of conductive material 88, 90. The indicator 94 may be affixed to or imprinted on the top portion 88a of the first sheet of conductive material 88 (i.e., on the top of the sensor 30). In some embodiments, the indicator 94 is an arrow.

Figure 5A:
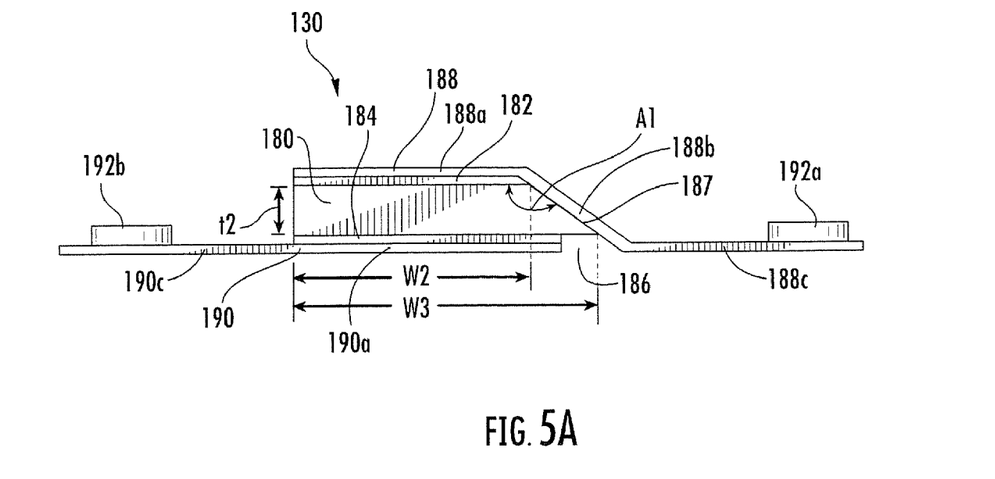
FIG. 5A is a side view of a sensor according to other embodiments of the present invention.
Figure 5B:
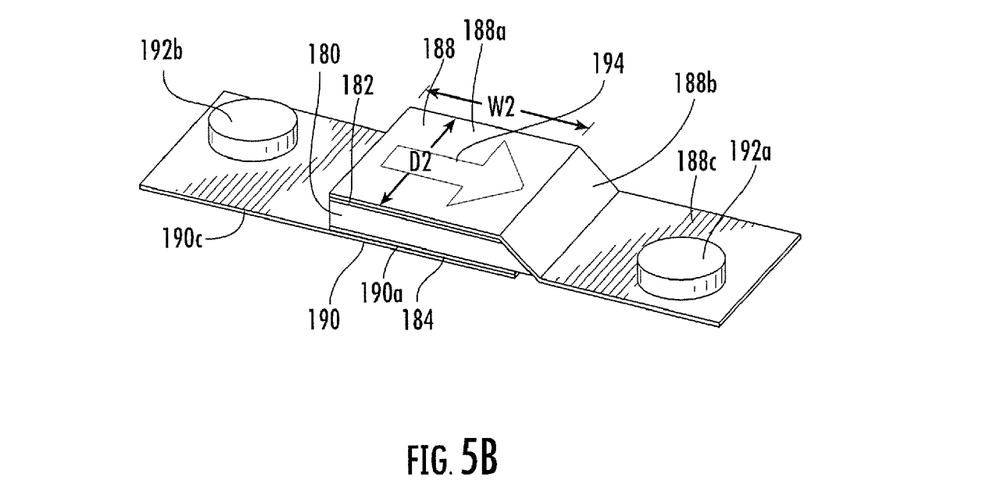
FIG. 5B is a top perspective view of the sensor of FIG. 5A.

FIGS. 5A-5B illustrate a sensor 130 according to some embodiments of the present invention. The sensor 130 includes a substrate 180. The substrate 180 may be a piezoelectric material. The substrate 180 typically has a width W2 between about 2 mm and about 20 mm at its top surface, a width W3 between about 3 mm and about 21 mm at its bottom surface, a depth D2 between about 2 mm and about 20 mm, and a thickness t2 between about 0.5 mm and about 5 mm.

A first electrode 182 overlies the top surface of the substrate 180 and a second electrode 184 underlies the bottom surface of the substrate 180. The electrodes 182, 184 typically have thicknesses of less than about 0.05 mm (0.002 inches). The first electrode 182 overlies the entire width W2 of the substrate 180. The second electrode 184 underlies only a portion of the width W3 of the substrate 180, thereby forming a gap 186 adjacent the bottom surface and a side surface 187 of the substrate 180. The gap 186 typically has a width of between about 0.5 mm and about 5 mm and spans the entire depth D2 of the substrate 180.

As illustrated in FIGS. 5A-5B, the side surface 187 of the substrate 180 is sloped. In this regard, the top surface and the side surface 187 of the substrate 180 form an obtuse angle A1. The obtuse angle A1 is typically between about 120 degrees and about 150 degrees. In some embodiments, the obtuse angle A1 is about 135 degrees.

A top portion 188a of a first sheet of conductive material 188 is attached to the first electrode 182. The first sheet of conductive material 188 is bent and attached to the side surface 187 of the substrate 180, thereby forming a side portion 188b of the first sheet of conductive material 188. The first sheet of conductive material 188 is bent again to extend in a first direction away from the bottom of the substrate 180, thereby forming an extended portion 188c of the first sheet of conductive material 188. The side portion 188b is attached to the side surface 187 of the substrate 180 by any technique known to those skilled in this art; an exemplary technique is adhesive bonding via the use of adhesive transfer tape manufactured by 3M™. Because the first sheet of conductive material 188 is attached to the side surface 187 of the substrate 180, the first sheet 188 does not span an unsupported distance as it is extended away from the substrate 180. The likelihood of catastrophic failure of the first sheet of conductive material 188 is greatly reduced because it is fully supported along its length. The sloped side surface 187 of the substrate 180 may offer additional advantages. The first sheet of conductive material 188 can be bent in a more gentle fashion (i.e., it does not have to be bent at a right angle in two locations). Also, it is less likely that the first sheet of conductive material 188 will become detached from the sloped side surface 187 of the substrate 180.

A bottom portion 190a of a second sheet of conductive material 190 is attached to the second electrode 184. The second sheet of conductive material 190 is extended in a second direction away from the bottom of the substrate 180, thereby forming an extended portion 190c of the second sheet of conductive material 190. The second direction associated with the second sheet of conductive material 190 is opposite the first direction associated with the first sheet of conductive material 188. In this regard, the extended portions 188c, 190c serve as "wings" which may contact the leads 28a, 28b, as described in more detail below.

The bottom portion 190a of the second sheet of conductive material 190 is attached to the second electrode 184 such that the gap 186 is preserved. The gap 186 serves to electrically isolate the electrodes 182, 184 as well as the sheets of conductive material 188, 190.

The sheets of conductive material 188, 190 typically have thicknesses between about 0.001 and about 0.1 inches. The extended portions 188c, 190c typically extend a distance between about 2 mm and about 20 mm away from the bottom surface of the substrate 180. The sheets of conductive material 188, 190 may be copper or any other conductive material.

In some embodiments, the sensor 130 includes lead mounting locations 192a, 192b, which may serve as connection points for the leads 28a, 28b. The first lead mounting location 192a is located on the extended portion 188c of the first sheet of conductive material 188 and the second lead mounting location 192b is located on the extended portion 190c of the second sheet of conductive material 190. As illustrated in FIG. 5B, the lead mounting locations 192a, 192b may be offset such the first lead mounting location 192a is positioned diagonally opposite the second lead mounting location 192b. In some embodiments, the lead mounting locations 192a, 192b are solder dots.

As illustrated in FIG. 5B, the sensor 130 may include an indicator 194 to clearly indicate the polarity of the electrodes 182, 184 and the sheets of conductive material 188, 190. The indicator 194 may be affixed to or imprinted on the top portion 188a of the first sheet of conductive material 188 (i.e., on the top of the sensor 130). In some embodiments, the indicator 194 is an arrow.

Figure 6:
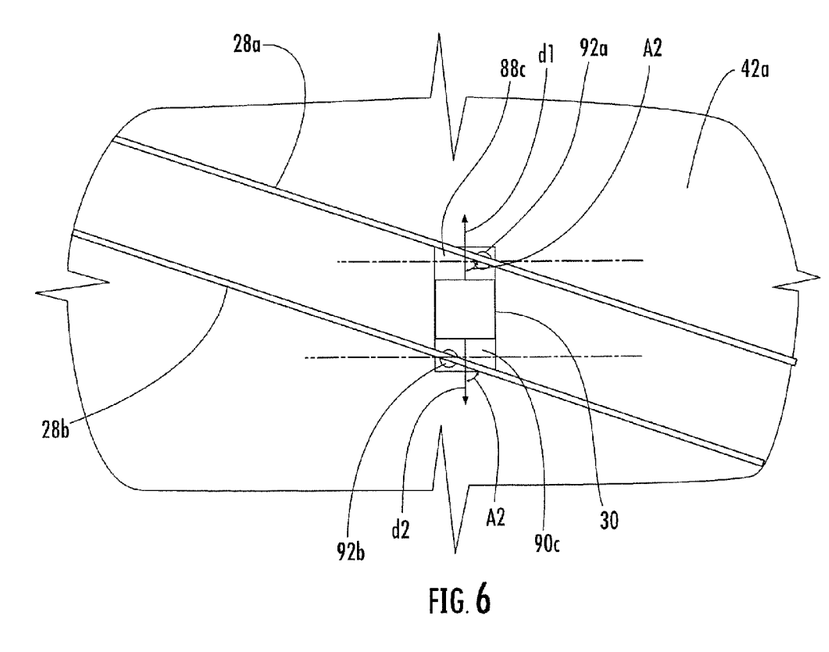
FIG. 6 is a greatly enlarged gage view of a sensor and attached leads for the roll of FIG. 1 according to some embodiments of the present invention.

Turning now to FIG. 6, and as noted above, the leads 28a, 28b may contact the sensor 30 at the extended portions 88c, 90c of the sheets of conductive material 88, 90. As exemplified in FIG. 6, the leads 28a, 28b may form an oblique angle A2 with the first and second directions d1, d2 associated with the extended portions 88c, 90c. In other embodiments, the leads 28a, 28b may form a right angle with the first and second directions d1, d2 associated with the extended portions 88c, 90c.

As illustrated in FIG. 6, where the leads 28a, 28b form the oblique angle A2 with the first and second directions d1, d2 associated with the extended portions 88c, 90c of the sheets of conductive material 88, 90, the leads 28a, 28b may only contact diagonally opposite corners of the extended portions 88c, 90c. In this regard, the angle A2 may be selected so that contact between the leads 28a, 28b and the sheets of conductive material 88, 90 is minimized. The oblique angle A2 is typically between about 1 degree and about 80 degrees. In some embodiments, the oblique angle A2 is between about 20 degrees and about 60 degrees.

In some embodiments, and as further illustrated in FIG. 6, the sensor 30 may include lead mounting locations 92a, 92b on the extended portions 88c, 90c of the sheets of conductive material 88, 90. The lead mounting locations 92a, 92b may be offset such that they are positioned diagonally opposite each other. In this configuration, the lead mounting locations 92a, 92b are positioned to accept leads 28a, 28b that form the oblique angle A2 with the first and second directions d1, d2 associated with the extended portions 88c, 90c. In some embodiments, the lead mounting locations 92a, 92b are solder dots.

As exemplified in FIG. 6, the leads 28a, 28b may overlie the extended portions 88c, 90c of the sheets of conductive material 88, 90. In some other embodiments, the leads 28a, 28b may underlie the extended portions 88c, 90c. In still other embodiments, one of the leads 28a, 28b may overlie one of the extended portions 88c, 90c and the other of the leads 28a, 28b may underlie the other of the extended portions 88c, 90c.

Although the sensor 30 is illustrated in FIG. 6, the sensor 130 (with corresponding extended portions 188c, 190c of the sheets of conductive material 188, 190 and possibly lead mounting locations 192a, 192b) may replace the sensor 30.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An industrial roll, comprising:
   a substantially cylindrical core having an outer surface and an internal lumen;
   a polymeric cover circumferentially overlying the core outer surface; and
   a sensing system comprising:
   a plurality of sensors at least partially embedded in the cover, the sensors configured to sense an operating parameter of the roll and provide signals related to the operating parameter, wherein each of the plurality of sensors comprises:
   a first electrode overlying the top surface of a substrate and a second electrode underlying the bottom surface of the substrate, wherein the first electrode overlies the top surface of the substrate and the second electrode underlies only a portion of the bottom surface of the substrate, thereby forming a gap adjacent the bottom surface and a side surface of the substrate;
   a first sheet of conductive material attached to the first electrode and the side surface of the substrate and extended in a first direction away from the bottom surface of the substrate; and
   a second sheet of conductive material attached to the second electrode and extended in a second direction away from the bottom surface of the substrate, the second direction being opposite the first direction; and a processor operatively associated with the sensors that processes signals provided by the sensors.

2. The industrial roll as defined in claim 1, wherein the sensing system further comprises electrical leads that interconnect each of the plurality of sensors.

3. The industrial roll as defined in claim 2, wherein the electrical leads form an oblique angle between about 1 degree and about 80 degrees with the first and second directions.

4. The industrial roll as defined in claim 1, wherein each of the plurality of sensors further comprises a first lead mounting location on the extended portion of the first sheet of conductive material and a second lead mounting location on the extended portion of the second sheet of conductive material.

5. The industrial roll as defined in claim 4, wherein the sensing system further comprises electrical leads that interconnect each of the plurality of sensors at the lead mounting locations.

6. The industrial roll as defined in claim 4, wherein the lead mounting locations comprise solder dots.

7. The industrial roll as defined in claim 4, wherein the first lead mounting location is positioned diagonally opposite the second lead mounting location.

8. The industrial roll as defined in claim 1, wherein the sensors are configured to sense pressure.

9. The industrial roll defined in claim 1, wherein the sensors include an indicator to indicate the polarity of the electrodes and sheets of conductive material.

10. The industrial roll as defined in claim 1, wherein the cover includes a base layer that circumferentially overlies the core and a topstock layer that circumferentially overlies the base layer, and wherein the sensors are embedded in the base layer.

11. The industrial roll as defined in claim 10, wherein the topstock layer is formed of a material selected from the group consisting of: rubber and polyurethane.

12. The industrial roll as defined in claim 1, wherein the top surface and the side surface of the substrate form a right angle.

13. The industrial roll as defined in claim 1, wherein the extended portion of the first sheet of conductive material and the extended portion of the second sheet of conductive material are in substantially the same plane.

14. An industrial roll, comprising:
a substantially cylindrical core having an outer surface and an internal lumen;
a polymeric cover circumferentially overlying the core outer surface; and
a sensing system comprising:
a plurality of sensors at least partially embedded in the cover, the sensors configured to sense an operating parameter of the roll and provide signals related to the operating parameter, wherein each of the plurality of sensors comprises:
a first electrode overlying the top surface of a substrate and a second electrode underlying the bottom surface of the substrate, wherein the first electrode overlies the top surface of the substrate and the second electrode underlies only a portion of the bottom surface of the substrate, thereby forming a gap adjacent the bottom surface and a side surface of the substrate, and wherein the top surface and the side surface of the substrate form an obtuse angle;
a first sheet of conductive material attached to the first electrode and the side surface of the substrate and extended in a first direction away from the bottom surface of the substrate; and
a second sheet of conductive material attached to the second electrode and extended in a second direction away from the bottom surface of the substrate, the second direction being opposite the first direction; and
a processor operatively associated with the sensors that processes signals provided by the sensors.

15. The industrial roll as defined in claim 14, wherein the sensing system further comprises electrical leads that interconnect each of the plurality of sensors.

16. The industrial roll as defined in claim 15, wherein the electrical leads form an oblique angle between about 1 degree and about 80 degrees with the first and second directions.

17. The industrial roll as defined in claim 14, wherein each of the plurality of sensors further comprises a first lead mounting location on the extended portion of the first sheet of conductive material and a second lead mounting location on the extended portion of the second sheet of conductive material.

18. The industrial roll as defined in claim 17, wherein the sensing system further comprises electrical leads that interconnect each of the plurality of sensors at the lead mounting locations.

19. The industrial roll as defined in claim 17, wherein the lead mounting locations comprise solder dots.

20. The industrial roll as defined in claim 17, wherein the first lead mounting location is positioned diagonally opposite the second lead mounting location.

21. The industrial roll as defined in claim 14, wherein the sensors are configured to sense pressure.

22. The industrial roll defined in claim 14, wherein the sensors include an indicator to indicate the polarity of the electrodes and sheets of conductive material.

23. The industrial roll as defined in claim 14, wherein the cover includes a base layer that circumferentially overlies the core and a topstock layer that circumferentially overlies the base layer, and wherein the sensors are embedded in the base layer.

24. The industrial roll as defined in claim 23, wherein the topstock layer is formed of a material selected from the group consisting of: rubber and polyurethane.

25. The industrial roll as defined in claim 14, wherein the obtuse angle is between about 120 degrees and about 135 degrees.

26. The industrial roll as defined in claim 14, wherein the extended portion of the first sheet of conductive material and the extended portion of the second sheet of conductive material are in substantially the same plane.

27. An industrial roll, comprising:
a substantially cylindrical core having an outer surface and an internal lumen;
a polymeric cover circumferentially overlying the core outer surface; and
a sensing system comprising:
a plurality of piezoelectric sensors at least partially embedded in the cover, the sensors configured to sense pressure experienced by the roll and provide signals related to the pressure, wherein each of the plurality of sensors comprises:
a first electrode overlying the top surface of a substrate and a second electrode underlying the bottom surface of the substrate, wherein the first electrode overlies the top surface of the substrate and the second electrode underlies only a portion of the bottom surface of the substrate, thereby forming a gap adjacent the bottom surface and a side surface of the substrate;

a first sheet of conductive material attached to the first electrode and the side surface of the substrate and extended in a first direction away from the bottom surface of the substrate; and a second sheet of conductive material attached to the second electrode and extended in a second direction away from the bottom surface of the substrate, the second direction being opposite the first direction; and a processor operatively associated with the sensors that processes signals provided by the sensors.

\* \* \* \* \*